(12) United States Patent
Spangler

(10) Patent No.: US 10,294,799 B2
(45) Date of Patent: May 21, 2019

(54) PARTIAL TIP FLAG

(71) Applicant: United Technologies Corporation, Hartford, CT (US)

(72) Inventor: Brandon W. Spangler, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 855 days.

(21) Appl. No.: 14/853,182

(22) Filed: Sep. 14, 2015

(65) Prior Publication Data

US 2016/0194965 A1  Jul. 7, 2016

Related U.S. Application Data

(60) Provisional application No. 62/078,611, filed on Nov. 12, 2014.

(51) Int. Cl.
*F01D 5/18* (2006.01)
*F01D 9/04* (2006.01)

(52) U.S. Cl.
CPC ............ *F01D 5/187* (2013.01); *F01D 5/186* (2013.01); *F01D 9/041* (2013.01);
(Continued)

(58) Field of Classification Search
CPC . F01D 5/18; F01D 5/187; F01D 5/186; F01D 5/188; F01D 9/041; F05D 2220/32; F05D 2240/12; F05D 2240/121; F05D 2240/122; F05D 2240/125; F05D 2240/30; F05D 2240/303; F05D 2240/304;
(Continued)

(56) References Cited

U.S. PATENT DOCUMENTS 3,628,885 A * 12/1971 Sidenstick ............... F01D 5/189
416/217
4,180,373 A * 12/1979 Moore .................... F01D 5/187
415/115

(Continued)

FOREIGN PATENT DOCUMENTS

JP         2003322003         11/2003

OTHER PUBLICATIONS

Extended European Search Report dated Apr. 4, 2016 in European Application No. 15192595.5.
(Continued)

*Primary Examiner* — Ninh H. Nguyen
*Assistant Examiner* — Wayne A Lambert
(74) *Attorney, Agent, or Firm* — Snell & Wilmer, L.L.P.

(57) ABSTRACT

A rotor blade of a turbine engine may have internal passages to permit the travel of cooling air through the blade. These passages may include a tip flag, a serpentine channel, and a trailing edge channel. The tip flag may extend radially outward along the leading edge of the rotor blade and may turn axially aftward along the tip of the rotor blade. The tip flag may terminate forward of a portion of the serpentine channel and the trailing edge channel. Thus the tip flag may be a "partial tip flag." The internal passages may be arranged to ameliorate the effect of ambient pressure variations, such as between the leading edge and the trailing edge of the rotor blade, on the flow travel of cooling air through the rotor blade.

14 Claims, 6 Drawing Sheets

(52) U.S. Cl.
CPC ...... *F05D 2220/32* (2013.01); *F05D 2230/00* (2013.01); *F05D 2240/12* (2013.01); *F05D 2240/30* (2013.01); *F05D 2240/303* (2013.01); *F05D 2240/304* (2013.01); *F05D 2250/185* (2013.01); *F05D 2260/202* (2013.01); *Y02T 50/673* (2013.01); *Y02T 50/676* (2013.01)

(58) Field of Classification Search
CPC .......... F05D 2240/307; F05D 2230/00; F05D 2250/185; F05D 2260/202; F05D 2260/203; Y02T 50/673; Y02T 50/676
See application file for complete search history.

(56) References Cited

U.S. PATENT DOCUMENTS

| | | | | |
|---|---|---|---|---|
| 4,257,737 | A * | 3/1981 | Andress | F01D 5/187 415/115 |
| 4,474,532 | A * | 10/1984 | Pazder | F01D 5/187 415/115 |
| 4,514,144 | A * | 4/1985 | Lee | B22C 9/04 416/96 R |
| 4,753,575 | A * | 6/1988 | Levengood | F01D 5/187 415/115 |
| 4,767,268 | A | 8/1988 | Auxier et al. | |
| 5,387,085 | A * | 2/1995 | Thomas, Jr. | F01D 5/187 415/115 |
| 5,403,159 | A * | 4/1995 | Green | F01D 5/187 416/97 R |
| 5,591,007 | A * | 1/1997 | Lee | F01D 5/187 416/97 R |
| 5,902,093 | A * | 5/1999 | Liotta | F01D 5/20 415/115 |
| 6,126,396 | A * | 10/2000 | Doughty | F01D 5/187 416/97 R |
| 6,220,817 | B1 | 4/2001 | Durgin et al. | |
| 6,224,336 | B1 * | 5/2001 | Kercher | F01D 5/186 415/115 |
| 6,471,479 | B2 * | 10/2002 | Starkweather | F01D 5/187 416/97 R |
| 6,672,836 | B2 * | 1/2004 | Merry | F01D 5/187 415/178 |
| 7,104,757 | B2 * | 9/2006 | Gross | F01D 5/187 415/115 |
| 7,131,818 | B2 * | 11/2006 | Cunha | F01D 5/187 416/97 R |
| 7,296,972 | B2 * | 11/2007 | Liang | F01D 5/187 416/92 |
| 7,334,991 | B2 * | 2/2008 | Liang | F01D 5/081 416/97 R |
| 7,632,071 | B2 * | 12/2009 | Charbonneau | F01D 5/081 416/193 A |
| 7,665,968 | B2 * | 2/2010 | Mongillo, Jr. | F01D 5/187 416/97 R |
| 7,713,026 | B1 * | 5/2010 | Liang | F01D 5/186 415/1 |
| 7,967,563 | B1 * | 6/2011 | Liang | F01D 5/186 415/115 |
| 7,988,417 | B1 * | 8/2011 | Liang | F01D 5/186 415/115 |
| 8,585,351 | B2 * | 11/2013 | Bregman | F01D 5/187 415/115 |
| 8,702,391 | B2 * | 4/2014 | Bregman | F01D 5/187 416/96 R |

OTHER PUBLICATIONS

European Patent Office, European Office Action dated Jul. 25, 2018 in Application No. 15192595.5-1006.

* cited by examiner forming an airfoil having a body defining a tip flag terminating at a tip flag terminus axially forward of a trailing edge of the airfoil — 501

500

PARTIAL TIP FLAG

CROSS-REFERENCE TO RELATED APPLICATIONS

This application is a nonprovisional of, and claims priority to, and the benefit of U.S. Provisional Application No. 62/078,611, entitled "PARTIAL TIP FLAG," filed on Nov. 12, 2014, which is hereby incorporated by reference in its entirety.

FIELD

The present disclosure relates generally to a gas turbine engine, and more specifically, to airfoils such as rotor blades and/or vanes.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and, optionally, an electric generator to generate mechanical and/or electrical power.

The efficiency of the engine can be increased by passing a higher temperature gas flow through the turbine. However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow. The leading edge of the vane and blade airfoils is exposed to high temperature gas flow.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

An airfoil is disclosed. The airfoil may have a body defining a tip flag configured to conduct cooling air through the body, wherein the tip flag terminates at a tip flag terminus axially forward of a trailing edge of the airfoil.

The airfoil may be a rotor blade or it may be a turbine vane.

The body of the airfoil may further define a serpentine channel and a trailing edge channel, each configured to conduct cooling air through the body with the serpentine channel terminating at a serpentine channel terminus and the trailing edge channel terminating at a trailing edge channel terminus. The tip flag terminus may be axially forward of the serpentine channel terminus and the serpentine channel terminus may be axially forward of the trailing edge channel terminus.

The tip flag may include a tip flag leading edge channel disposed along a leading edge of the rotor blade, a longitudinal tip channel extending axially aftward along a radially outermost surface of the rotor blade and terminating at the tip flag terminus. It may also include a first tip flag channel turn including an about 90-degree bend proximate to a corner of the leading edge of the rotor blade and the radially outermost surface of the rotor blade connecting the tip flag leading edge channel to the longitudinal tip channel.

The tip flag leading edge channel may include an outflow orifice defining a through hole in a surface of the rotor blade proximate to the tip flag leading edge channel and in fluidic communication with the tip flag leading edge channel.

The tip flag terminus defines a through hole disposed in the radially outermost surface of the rotor blade and in fluidic communication with the longitudinal tip channel.

The body may further define a tip channel core tie disposed in the longitudinal tip channel and defining a through hole in the radially outermost surface of the rotor blade, and a leading edge corner core tie disposed in the first tip flag channel turn and defining a through hole in the radially outermost surface of the rotor blade.

The serpentine channel may include a first serpentine channel section disposed radially along the rotor blade and immediately axially aftward of the tip flag leading edge channel, a second serpentine channel section disposed radially along the rotor blade and immediately axially aftward of the first serpentine channel section, and a third serpentine channel section disposed radially along the rotor blade and immediately axially aftward of the second serpentine channel section. The serpentine channel may include a first serpentine channel turn including an about 180-degree bend connecting the first serpentine channel section and the second serpentine channel section, and a second serpentine channel turn including an about 180-degree bend connecting the second serpentine channel section and a third serpentine channel section. The serpentine channel terminus may define a through hole of the third serpentine channel section disposed in the radially outermost surface of the rotor blade and in fluidic communication with the third serpentine channel section.

The body may further define a longitudinal serpentine outflow orifice in the serpentine channel, the longitudinal serpentine outflow orifice defining a through hole in the radially outermost surface of the rotor blade proximate to the third serpentine channel section and in fluidic communication with the third serpentine channel section.

The trailing edge channel may include a first trailing edge channel section disposed radially along the rotor blade and immediately axially forward of a trailing edge of the rotor blade.

The body may further define a trailing edge channel outflow orifice in the trailing edge channel, the trailing edge channel outflow orifice defining a through hole in the trailing edge of the body proximate to the trailing edge channel and in fluidic communication with the trailing edge channel.

The body may further define a trailing edge terminus core tie defining a through hole in a radially outermost surface of the rotor blade and in fluidic communication with the trailing edge channel.

A turbine engine assembly is disclosed. The turbine engine assembly may include a high-speed spool comprising a row of circumferentially rotating rotors, each rotor including a plurality of rotor blades. Each rotor blade may include an airfoil as disclosed.

A method of manufacturing an airfoil is also disclosed. The method may include forming an airfoil having body defining a tip flag configured to conduct cooling air through the body along a leading edge of the body, wherein the tip flag terminates at a tip flag terminus axially forward of a trailing edge of the rotor blade. The forming step may further include forming a tip flag leading edge channel along a leading edge of the body comprising the airfoil, and forming a longitudinal tip channel extending axially aftward along a radially outermost surface of the body and terminating at a tip flag terminus axially forward of a trailing edge of the body.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
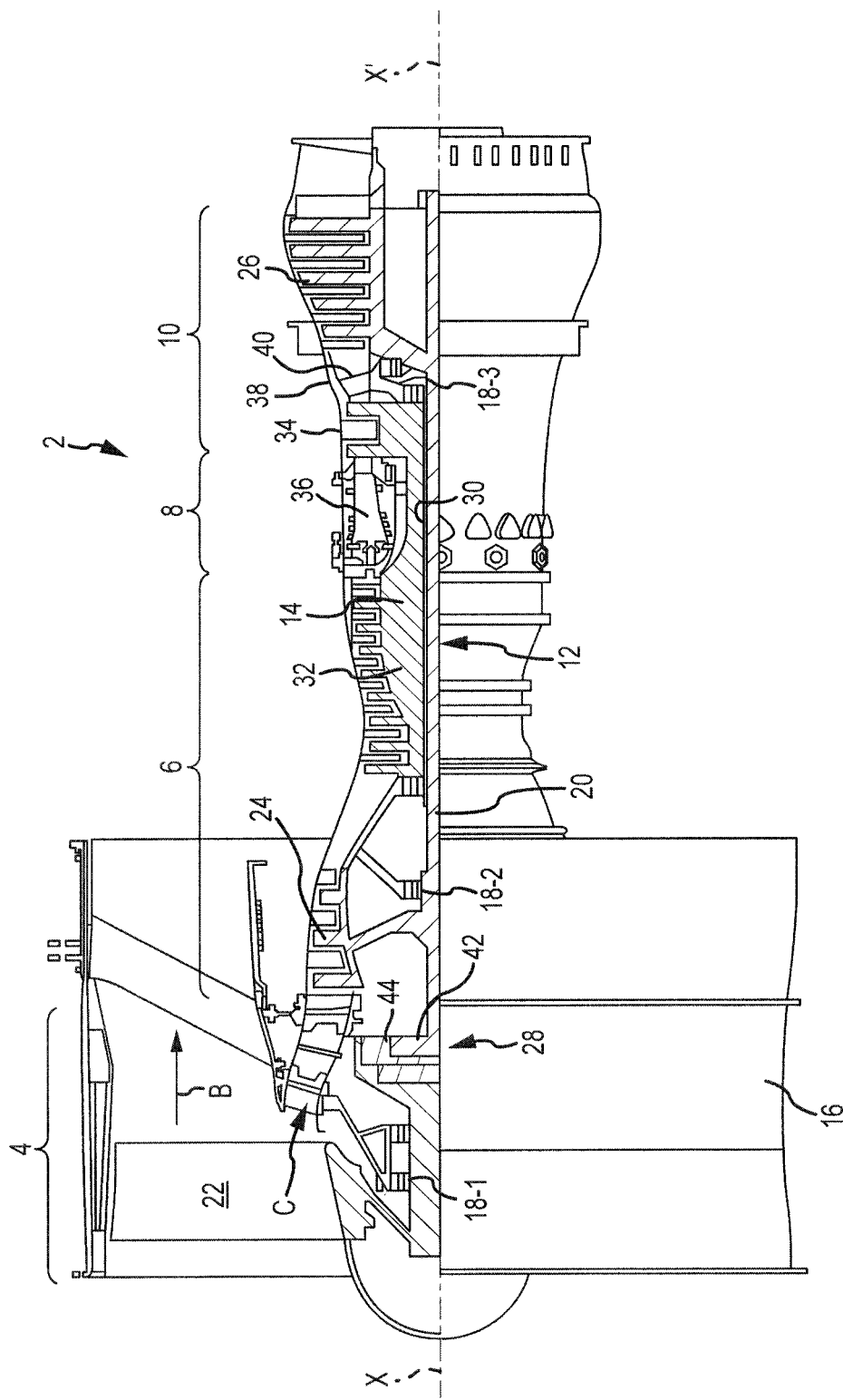
FIG. 1 illustrates cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component.

A first component that is "axially forward" of a second component means that a first component is positioned nearer to the leading edge and farther from the trailing edge of a rotating structure, than the second component. A first component that is "axially aft" of a second component means that the first component is positioned farther from the leading edge and nearer to the trailing edge of a rotating structure, than the second component.

Figure 2:
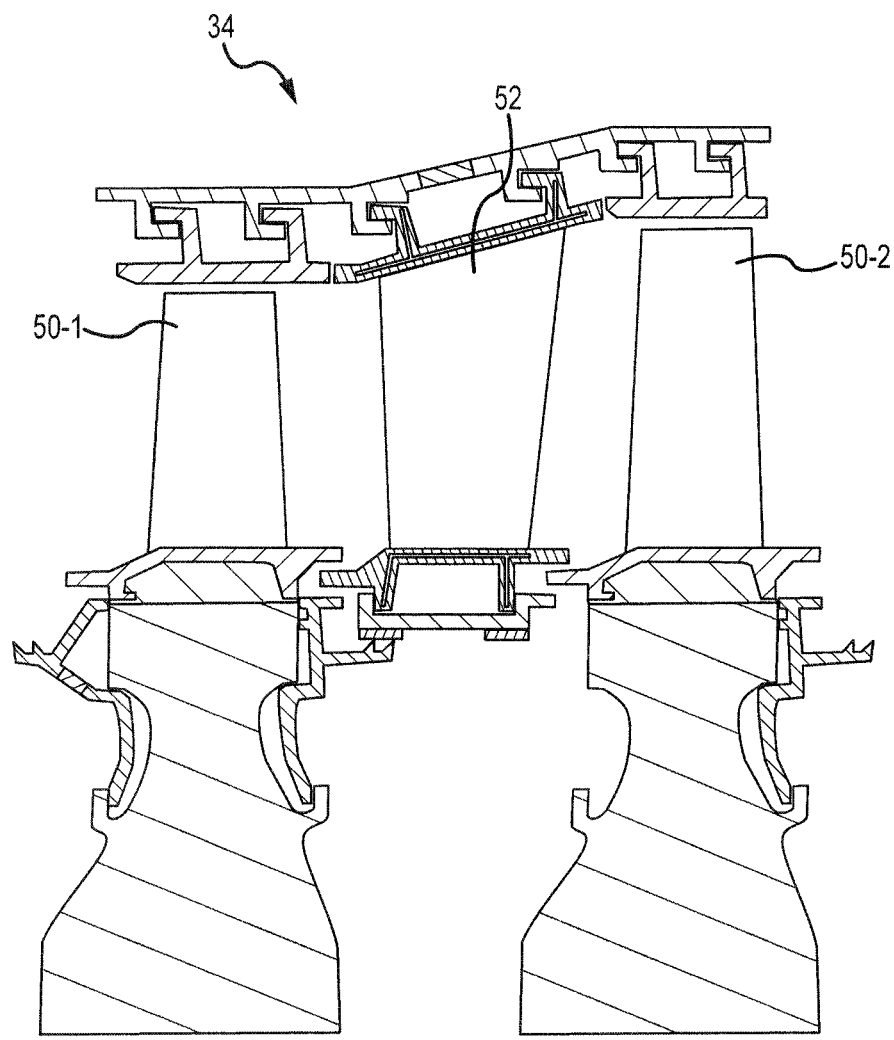
FIG. 2 illustrates a cross-sectional view of a airfoils, specifically a turbine blade and turbine vanes in accordance with various embodiments.

In various embodiments and with reference to FIGS. 1 and 2, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. Low pressure turbine section 26 pressure ratio may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which requires higher pressure ratios and higher temperatures in the high speed spool 14. These higher operating temperatures and pressure ratios may create operating environments that may cause thermal loads that are higher than previous thermal loads, which may shorten the endurance life of current components.

In various embodiments, high speed spool 14 may comprise alternating rows of rotating rotors and stationary stators. Stators may have a cantilevered configuration or a shrouded configuration. More specifically, stator may comprise an airfoil, such as a stator vane, a casing support and a hub support. In this regard, stator vane may be supported along an outer diameter by casing support and along an inner diameter hub support. In contrast, a cantilevered stator may comprise a stator vane that is only retained and/or supported at the casing (e.g., an outer diameter).

In various embodiments, airfoils such as rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or high pressure section) to increase and/or improve the efficiency of the engine and, more specifically, to achieve maximum and/or near maximum compression and efficiency when the straightened air is compressed and spun by rotor(s).

Operating conditions in high pressure compressor section 32 may be approximately 1400° F. (approximately 760° C.) or more. As noted above and with reference to FIGS. 1 and 2, rotor blades 50 (such as rotor blades 50-1, 50-2) and vanes (such as stator vane 52) are subject to a high external heat load that is much localized to the stagnation location, which is where the hot combustion gases impinge on the airfoil.

As such, cooling holes may be positioned in the surface of at least one of the blades and the vanes. Cooling air may be ejected from the cooling holes. The cooling holes may be configured to produce a layer of cooling air that flows over the leading edge surface and/or other surfaces to protect the metal surface from exposure to the high temperature hot gas flow. The cooling air may be ejected in a radial direction and/or an axial direction of the blade or vane. A portion of the cooling air will thus migrate onto the leading edge surface of the blade or vane to provide a layer of cooling air.

Moreover, cooling channels may be positioned within the interior volume of at least one of the blades or vanes. Cooling air may be conducted through the cooling channels in route to the cooling holes. The cooling channels may be configured to conduct heat from the blades and/or vane, to the cooling air flowing through the cooling channel to protect the blade and/or vane from overheating.

Furthermore, because different gaspath pressures exist at different cooling holes, multiple cooling channels may be desired in order to provide pressure isolation between different cooling channels and different cooling holes. Because the cooling holes receive cooling air from the cooling channels, in order to facilitate the setting of the different pressures at different cooling holes, the different cooling holes may be variously connected to different channels.

Still furthermore, manufacturing considerations may dictate that the one or more cooling channels be connected, such as by core ties. A core tie is a manufacturing artifact caused by a structure used to connect between the cooling channels during the casting process to join different casting structures together, reducing undesirable movement and part breakage during the manufacturing process. However, the shape, number, and location of connections between cooling channels may interact with the shape, number and location of cooling holes, as well as the shape, length, and other features of the cooling channels, in order to affect the pressure of the cooling air at each cooling holes. As such, configurations that may be easily manufactured may not produce a desired cooling behavior, whereas configurations that produce a desired cooling behavior may be difficult to manufacture. Various embodiments to address these countervailing considerations are presented herein. Moreover, and with reference to FIG. 2, while various features are discussed herein with reference to rotor blade(s) 50-1 and 50-2, similar features may alternately or additionally be implemented in stator vanes 52. Thus, while features of a rotor blade 50 are discussed below, these features may be similarly implemented in stator vanes 52.

Figure 3:
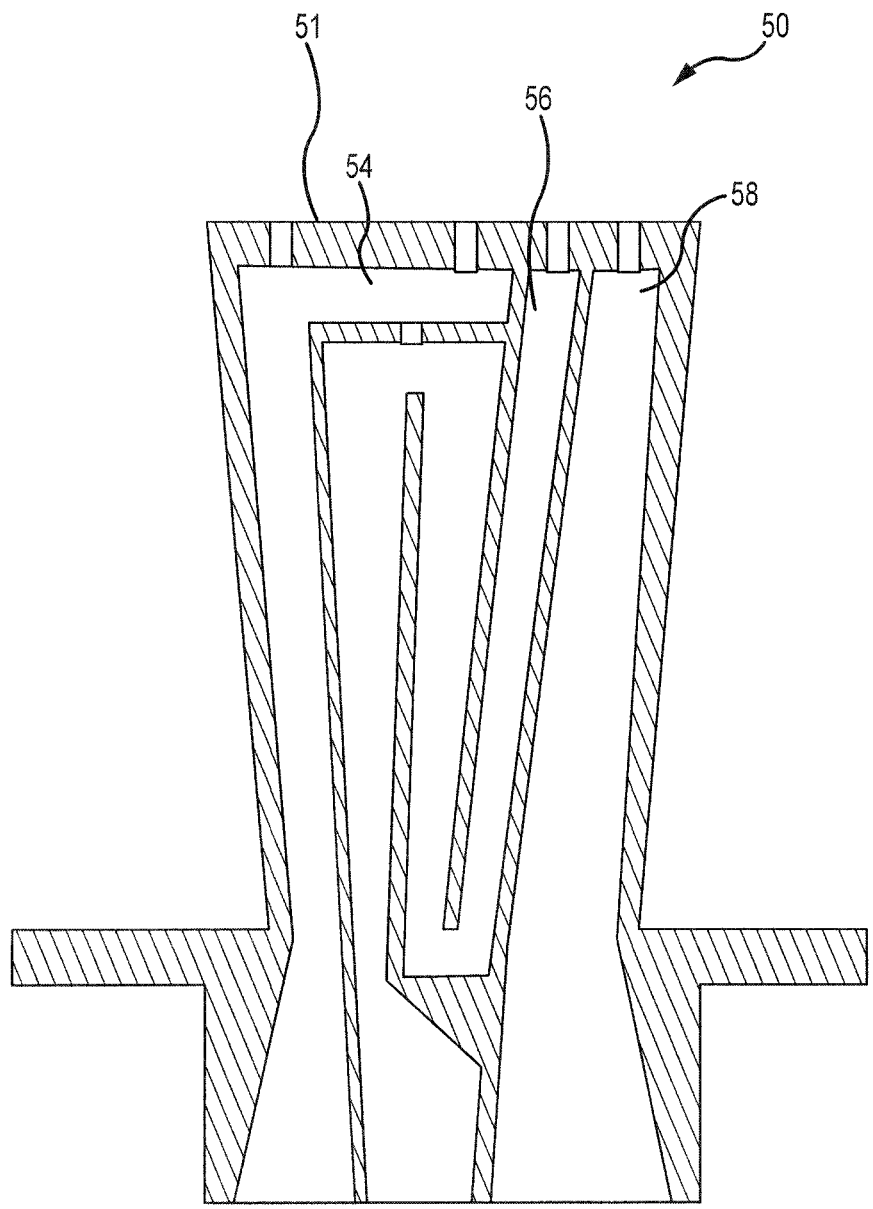
FIG. 3 illustrates a cross-sectional view of a portion of an airfoil of a turbine in accordance with various embodiments.
Figure 4:
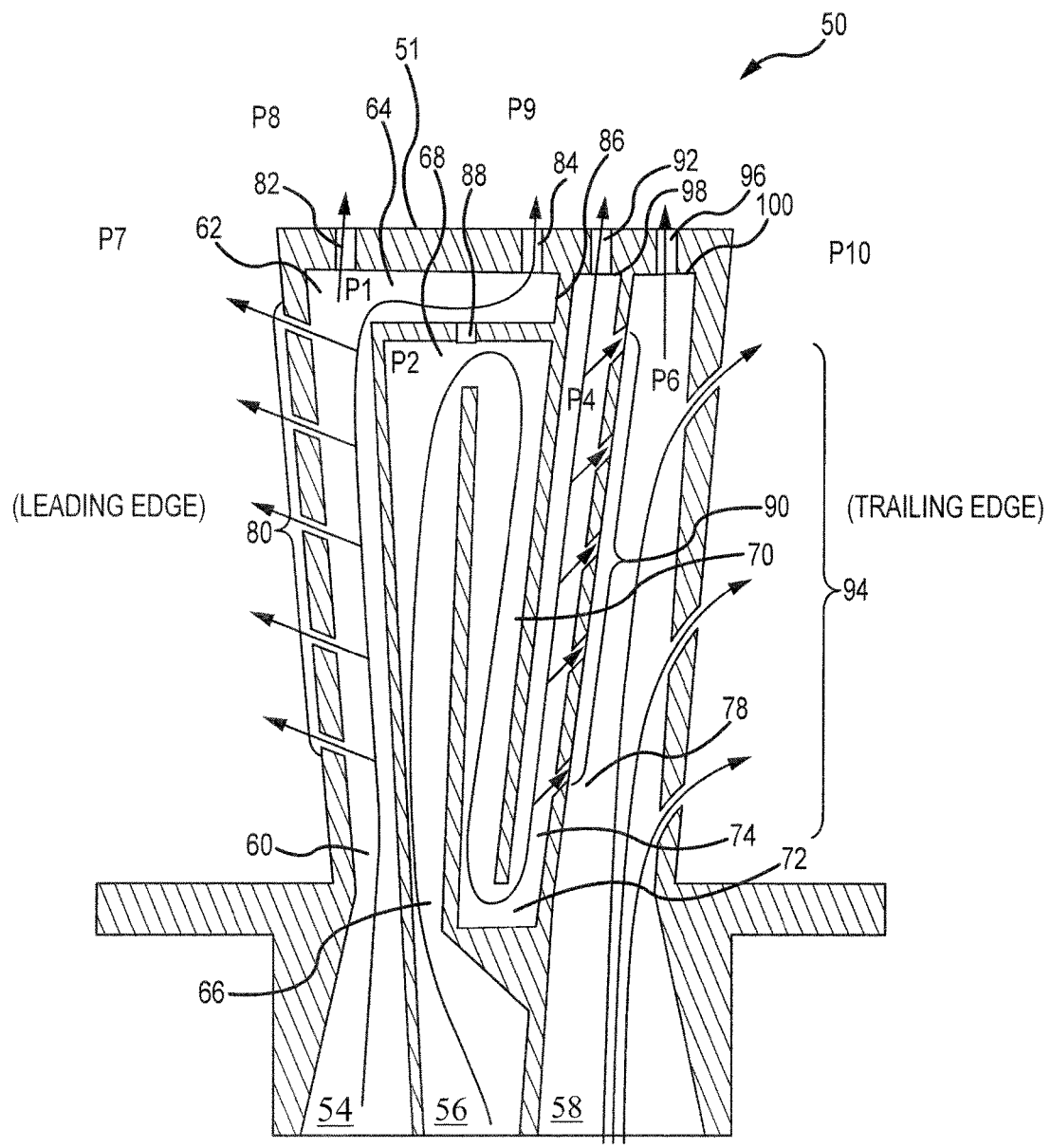
FIG. 4 illustrates a detailed cross-sectional view of the portion of the airfoil of FIG. 3 in accordance with various embodiments.

For example with reference to FIG. 3, an airfoil, for example, a rotor blade 50 may comprise a body that defines a tip flag 54, a serpentine channel 56 and a trailing edge channel 58, each comprising a channel disposed within the body of the rotor blade 50 and configured to conduct cooling air through various portions of the rotor blade 50. Thus, one may appreciate that as used herein "body" refers to the solid material portion of rotor blade 50. Moreover, while features of a rotor blade 50 (FIG. 2) are discussed, because these features may similarly be implemented in stator vanes 52 (FIG. 2), "body" may also refer to the solid material portion of a stator vane 52 (FIG. 2), as applicable. In various embodiments, the tip flag 54 is the axially forward most channel and the trailing edge channel 58 is the axially aft-most channel relative to the gas turbine engine 2 (FIG. 1) and the engine central longitudinal axis X-X'. Thus, the tip flag 54 may follow along the leading edge of the rotor blade 50 and the trailing edge channel 58 may follow along the trailing edge of the rotor blade 50. The serpentine channel 56 may comprise one or more turns or curves and may be positioned partially radially inward of at least a portion of both the tip flag 54 and the trailing edge channel 58. For example, first serpentine channel turn (FIG. 4; 68) may be radially inward of longitudinal tip channel (FIG. 4; 64). The serpentine channel 56 may be axially aft of at least a portion of the tip flag 54, as discussed further herein. As will be appreciated with reference to the Figures, certain details shown in FIG. 4 are omitted from FIG. 3 for clarity of illustration. However, both Figures may be referenced separately or together in order to appreciate various aspects of the disclosure herein.

With reference to FIGS. 3 and 4, the tip flag 54 of the rotor blade 50 may comprise any channel whereby cooling air is conducted proximate to the radially outermost edge 51 (e.g., the "tip") of the rotor blade 50. In various embodiments, the tip flag 54 comprises a channel running parallel to the leading edge of the rotor blade 50, then turning about 90 degrees to run parallel to the radially outermost edge 51 of the rotor blade 50. The tip flag 54 may comprise a leading edge channel 60 disposed along the leading edge of the rotor blade 50, a first tip flag channel turn 62 comprising an about 90 degree bend proximate to the corner of leading edge of rotor blade 50 and the radially outermost edge 51 of the rotor blade 50 and a longitudinal tip channel 64 comprising a channel extending axially aftward along the radially outermost edge 51 (e.g., the "tip") of rotor blade 50.

The trailing edge channel 58 of the rotor blade 50 may comprise any channel whereby cooling air is conducted proximate to axially aft most edge (e.g., the "trailing edge") of the rotor blade 50. In various embodiments, the trailing edge channel 58 comprises a first trailing edge channel section 78. The first trailing edge channel section 78 may comprise a channel running radially along the trailing edge of the rotor blade 50. The cooling air conducted through the first trailing edge channel section 78 may have a fluid pressure, P6. The ambient external fluid pressure adjacent to the trailing edge of the rotor blade 50 may have a fluid pressure, P10. Fluid pressures P6 and P10 are discussed further below.

The serpentine channel 56 of the rotor blade 50 may comprise any channel whereby cooling air is conducted through a portion of the rotor blade 50 axially forward of the trailing edge and axially aft of the leading edge of the rotor blade 50. In further embodiments, the serpentine channel 56 is disposed axially forward of the first trailing edge channel section 78 of that trailing edge channel 58 and also axially aft of the leading edge channel 60 of the tip flag 54. Furthermore, in various embodiments, the serpentine channel 56 of the rotor blade 50 is radially inward of the longitudinal tip channel 64 of that tip flag 54.

Having discussed various aspects of the rotor blade 50, attention is directed to various aspects of various features of the tip flag 54, discussed above. The leading edge channel 60 may comprise leading edge outflow orifices 80 defined through the leading edge. Leading edge outflow orifices 80 may comprise through holes in the surface of the rotor blade 50 proximate to the leading edge channel 60 of the tip flag 54. The leading edge outflow orifices 80 may permit fluidic communication between the leading edge channel 60 and the area immediately external to the leading edge of the rotor blade 50. Thus, as discussed previously, the orifices may enhance the cooling of the rotor blade 50. The ambient external fluid pressure adjacent to the leading edge of the rotor blade 50 may have a fluid pressure, P7. Fluid pressure P7, as well as the relationship among different fluid pressures is discussed further below.

The first tip flag channel turn 62 may comprise an approximately 90-degree bend located at the radially outermost end of the leading edge channel 60. At this point, the leading edge channel 60 may turn approximately 90 degrees from extending radially outward along the rotor blade 50 to extending axially aftward along the radially outermost edge 51 (e.g., the "tip") of the rotor blade 50 with the bend connecting a longitudinal tip channel 64 to the leading edge channel 60.

The longitudinal tip channel 64 of the tip flag 54 may comprise a channel extending axially aftward along the radially outermost edge 51 of the rotor blade 50 and in fluidic communication with the leading edge channel 60.

The longitudinal tip channel 64 of the tip flag 54 may terminate at a tip flag terminus 86. The tip flag terminus 86 may define a terminal end of the longitudinal tip channel 64 of the tip flag 54. The tip flag terminus 86 also may define a through hole, for example tip channel core tie 84 whereby cooling air transiting through the tip flag 54 may exit the tip flag 54 as discussed further herein. The tip flag terminus 86 may define a terminal end of the longitudinal tip channel 64 of the tip flag 54, said terminal end positioned axially forward (e.g., nearer to the leading edge of the rotor blade 50) of the serpentine channel terminus 98. Thus, the tip flag 54 may be said to be a "partial tip flag" because the tip flag terminus 86 is disposed axially forward of the trailing edge of the rotor blade 50, with the serpentine channel terminus 98 and the trailing edge channel terminus 100 being positioned progressively axially aftward of the tip flag terminus 86 and along the radially outermost edge 51 (e.g., "tip") of the rotor blade 50.

The rotor blade 50 may further comprise a serpentine channel 56. The serpentine channel 56 may comprise a series of channels running radially outward along the rotor blade 50 and thus substantially parallel to the leading edge and/or the trailing edge of the rotor blade 50. The serpentine channel 56 may comprise a first serpentine channel section 66 running radially outward along the rotor blade 50 and immediately axially aftward of the leading edge channel 60 of the tip flag 54. The serpentine channel 56 may further comprise a first serpentine channel turn 68 whereupon the first serpentine channel section 66 turns 180 degrees to connect to a second serpentine channel section 70, running radially inward along the rotor blade 50 and immediately axially aftward of the first serpentine channel section 66. The cooling air conducted through the first serpentine channel turn 68 may have a fluid pressure, P2, which is discussed further below. The serpentine channel 56 may comprise a second serpentine channel turn 72 whereupon the second serpentine channel section 70 turns 180 degrees to connect to a third serpentine channel section 74. The third serpentine channel section 74 may run radially outward along the rotor blade 50 and immediately axially aftward of the second serpentine channel section 70. The third serpentine channel section 74 may also lie immediately axially forward of the trailing edge channel 58, comprising the first trailing edge channel section 78 as discussed further herein. The third serpentine channel section 74 may terminate at a serpentine channel terminus 98.

The serpentine channel terminus 98 may define a terminal end of the serpentine channel 56. The serpentine channel terminus 98 may define a through hole, for example serpentine channel terminus core tie 92 whereby cooling air transiting through the serpentine channel 56 may exit the serpentine channel 56 as discussed further herein. Filmholes (longitudinal serpentine outflow orifices 90) defined on the pressure and suction sides of the airfoil may also purge the cooling air in the serpentine passage, as represented by the arrows.

The serpentine channel terminus 98 may define a terminal end of the third serpentine channel section 74, the terminal end positioned axially aft (e.g., farther from the leading edge of the rotor blade 50) of the tip flag terminus 86. Thus, as mentioned, the tip flag 54 may be said to be a "partial tip flag" because the tip flag terminus 86 is disposed axially forward of the trailing edge of the rotor blade 50 forward of the serpentine channel terminus 98 along the radially outermost edge 51 (e.g., "tip") of the rotor blade 50.

As discussed above, the serpentine channel 56 may further comprise longitudinal serpentine outflow orifices 90. Longitudinal serpentine outflow orifices 90 may comprise through holes in the aft most portion of the third serpentine channel section 74. These orifices may be spaced along the length of the third serpentine channel section 74. The longitudinal serpentine outflow orifices 90 may permit fluidic communication between the serpentine channel 56, for example, the third serpentine channel section 74, and the area immediately external to the trailing edge of the rotor blade 50. Thus, as discussed previously, the orifices may enhance the cooling of the rotor blade 50. The cooling air exiting the longitudinal serpentine outflow orifices 90 and/or serpentine channel terminus 98 may have a fluid pressure, P4. Fluid pressure P4, as well as the relationship among different fluid pressures is discussed further below.

The rotor blade 50 may further comprise a trailing edge channel 58. The trailing edge channel 58 may comprise one or more channels running radially outward along the rotor blade 50. Trailing edge channel 58 may comprise one or more channel that is also substantially parallel to the leading edge and/or the trailing edge of the rotor blade 50. The trailing edge channel 58 may comprise a first trailing edge channel section 78 proximate to the trailing edge of the rotor blade 50 and axially aft of the serpentine channel 56. The first trailing edge channel section 78 may conduct cooling air through the rotor blade 50 and terminate at a trailing edge channel terminus 100.

The trailing edge channel terminus 100 may define a terminal end of the trailing edge channel 58 (and the first trailing edge channel section 78). The trailing edge channel terminus 100 may define a through hole, for example trailing edge terminus core tie 96 whereby cooling air transiting through the trailing edge channel 58 may exit the trailing edge channel 58 as discussed further herein. The cooling air exiting the trailing edge channel terminus 100 may have a fluid pressure, P6.

The trailing edge channel 58 may further comprise trailing edge channel outflow orifices 94. Trailing edge channel outflow orifices 94 may comprise through holes in the axially aft most edge, or the trailing edge, of the rotor blade 50. These orifices may be spaced along the trailing edge of the rotor blade 50. The trailing edge channel outflow orifices 94 may permit fluidic communication between the trailing edge channel 58, for example, the first trailing edge channel section 78, and the area immediately external to the trailing edge of the rotor blade 50. Thus, as discussed previously, the orifices may enhance the cooling of the rotor blade 50. The cooling air exiting the trailing edge channel outflow orifices 94 may have a fluid pressure, P6, whereas the ambient air surrounding the trailing edge of the rotor blade 50 may have a fluid pressure, P10. Fluid pressure P10 and P6, as well as the relationship among different fluid pressures is discussed further below.

Having discussed various aspects of the tip flag 54, the serpentine channel 56 and the trailing edge channel 58, attention is now directed to various core ties. A core tie may define a through hole and/or a channel defined through a wall of rotor blade 50 between various channels and/or external surfaces of a rotor blade 50 described herein in order to facilitate manufacturability. For instance, in various embodiments a rotor blade 50 is manufactured by a casting process. The channels within the finished rotor blade 50 may comprise impressions of solid mold pieces. As such, various connective elements of the mold may cause there to be channels and/or through holes that are artifacts of the manufacturing process. In various embodiments, these artifacts are called "core ties."

The rotor blade 50 may comprise various core ties. The core ties may be positioned with consideration of both manufacturing concerns, and fluid dynamics considerations so that the rotor blade 50 behaves in a desired way. In various embodiments, a rotor blade 50 comprises one or more leading edge corner core tie 82, tip channel core tie 84, first serpentine channel turn core tie 88, serpentine channel terminus core tie 92, and trailing edge terminus core tie 96. These core ties may be located at different positions along different channels and may permit fluidic communication between various channels and/or the area immediately external to one of the trailing edge, the leading edge, and the radially outermost edge 51 (e.g., "tip") of the rotor blade 50. The cooling air exiting the different core ties may have different fluid pressures. Thus, the core ties, channels, and outflow orifices are configured in operative association with one another to enhance cooling of the rotor blade 50.

For example, cooling air exiting the leading edge corner core tie 82 may have a fluid pressure, P1, whereas the ambient air surrounding the leading edge corner core tie 82 position in the radially outermost edge 51 (e.g., "tip") of the rotor blade 50 may have a fluid pressure, P8. Cooling air exiting the tip channel core tie 84 may have a fluid pressure, P1, whereas the ambient air surrounding the tip channel core tie 84 position in the radially outermost edge 51 (e.g., "tip") of the rotor blade 50 may have a fluid pressure, P9. Cooling air in the first serpentine channel turn 68 may have a fluid pressure, P2 while the cooling air in the longitudinal tip channel 64 may have a fluid pressure, P1. Cooling air exiting the serpentine channel terminus core tie 92 may have a fluid pressure P4, and the ambient air surrounding the tip of the rotor blade 50 may have a fluid pressure P9. Cooling air exiting the trailing edge terminus core tie 96 may have a fluid pressure, P6, and the ambient air surrounding the trailing edge terminus core tie 96 position in the radially outermost edge 51 (e.g., "tip") of the rotor blade 50 may have a fluid pressure, P9.

Thus, various through holes and channels defined in rotor blade 50 may convey cooling air having various fluid pressures. The relationships among these different pressures may be determined by the length, shape, diameter, size, and other features of the various channels, turns, orifices and core ties. As such, the features may be selected to achieve various desired ratios between the different pressures. By selecting different ratios, different cooling characteristics may be effected as discussed below.

In general, P10 comprises a lower pressure than P9 and/or P7, because P10 is disposed at the aerodynamic trailing edge of the rotor blade 50 and P7 is disposed at the aerodynamic leading edge of the rotor blade 50, and P9 is disposed axially between P7 and P10, proximate to the tip of the rotor blade 50. Because fluid (e.g., air) pressure at P1 is in communication via tip channel core tie 84 with fluid (e.g., air) pressure at P9 which is proximate to the tip of the rotor blade 50, the flow of air through leading edge outflow orifices 80 is not affected by P10, which is proximate to the trailing edge of the rotor blade 50. Although P8 and P9 are both generally lesser than P7, so that the flow of air through leading edge outflow orifices 80 is affected by the flow through leading edge corner core tie 82 and tip channel core tie 84, this effect is minimal because the difference between P8 and/or P9 and P7 is not significant. Moreover, P1 and P2 are typically substantially identical, so that the flow of air through the tip flag 54 and serpentine channel 56 do not experience undue variations.

Thus, as one may appreciate, by generally isolating tip flag 54, serpentine channel 56, and trailing edge channel 58, and disposing each of leading edge corner core tie 82, tip channel core tie 84, serpentine channel terminus core tie 92, and trailing edge terminus core tie 96 in fluidic communication with the ambient environment proximate to the tip of the rotor blade 50, rather than the ambient environment proximate to at least one of the leading edge or the trailing edge of the rotor blade 50, the interaction of pressure variations at the trailing edge (e.g., pressure P10), and the leading edge (e.g., pressure P7) may be diminished.

Thus, by disposing the tip flag terminus 86 axially forward of the serpentine channel terminus 98, and by similarly disposing the serpentine channel terminus 98 axially forward of the trailing edge channel terminus 100, each terminus may be thus positioned on the radially outermost edge 51 of the rotor blade 50 (e.g., the "tip") so that variations in pressure between the leading edge and the trailing edge do not substantially interact with the flow of cooling air through the various channels. In this manner, effective cooling may be maintained at various stages of operation and under different conditions.

Figure 5A:
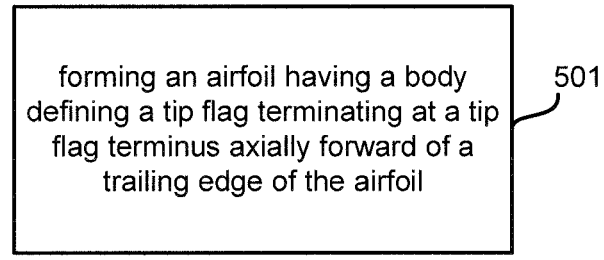
FIGS. 5A-B illustrate various steps of methods for forming an airfoil of a turbine in accordance with various embodiments.
Figure 5B:
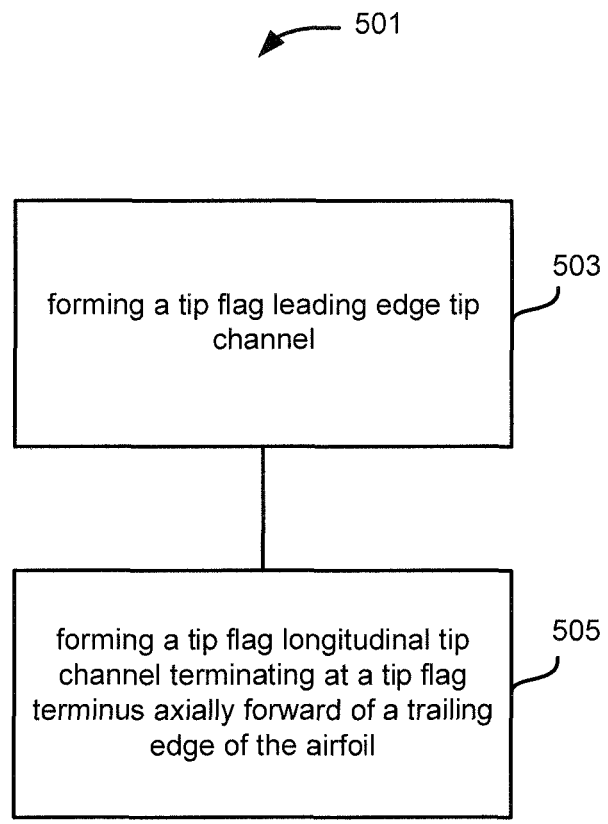

With reference to FIGS. 1-4, and with particular reference to FIG. 5A, a method 500 for forming an airfoil, such as a rotor blade 50 or a stator vane 52 is disclosed. The method may include forming an airfoil having a body defining a tip flag 54 configured to conduct cooling air through the body along a leading edge of the airfoil, wherein the tip flag 54 terminates at a tip flag terminus 86 axially forward of a trailing edge of the airfoil (Step 501). With additional reference to FIG. 5B, step 501 may further comprise forming a tip flag leading edge channel along a leading edge of the airfoil (Step 503), and forming a longitudinal tip channel 64 extending axially aftward along a radially outermost surface of the airfoil and terminating at a tip flag terminus 86 axially forward of a trailing edge of the airfoil (Step 505).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting. For example, while the discussion herein has been focused on airfoils comprising rotor blades 50 (FIG. 2), as also mentioned, the various features and elements may be implemented in airfoils comprising stator vanes 52 (FIG. 2), or any desired airfoil.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An airfoil comprising:
   a body defining:
   a tip flag comprising a tip flag channel running parallel to a leading edge of the airfoil, a longitudinal tip channel extending axially aftward along a radially outermost surface of the airfoil and terminating at a tip flag terminus, and a first tip flag channel turn comprising a 90-degree bend connecting the tip flag channel to the longitudinal tip channel, the tip flag configured to conduct cooling air through the body, wherein the tip flag terminus is axially forward of a trailing edge of the airfoil;

a serpentine channel terminating at a serpentine channel terminus;
a trailing edge channel terminating at a trailing edge channel terminus, the serpentine channel and the trailing edge channel configured to conduct cooling air through the airfoil;
a tip channel core tie disposed in the longitudinal tip channel at the tip flag terminus and defining a through hole in the radially outermost surface of the airfoil; and
a core tie disposed in the first tip flag channel turn and defining a through hole in the radially outermost surface of the airfoil;
the tip flag terminus is axially forward of the serpentine channel terminus and the serpentine channel terminus is axially forward of the trailing edge channel terminus.

2. The airfoil of claim 1, wherein the airfoil comprises one of: a rotor blade and a turbine vane.

3. The airfoil according to claim 1, wherein the tip flag channel comprises an outflow orifice defining a through hole in a surface of the airfoil proximate to the tip flag channel and in fluidic communication with the tip flag channel.

4. The airfoil according to claim 1, wherein the serpentine channel comprises:
a first serpentine channel section disposed radially along the airfoil and immediately axially aftward of the tip flag channel;
a second serpentine channel section disposed radially along the airfoil and immediately axially aftward of the first serpentine channel section;
a third serpentine channel section disposed radially along the airfoil and immediately axially aftward of the second serpentine channel section;
a first serpentine channel turn comprising a 180-degree bend connecting the first serpentine channel section and the second serpentine channel section; and
a second serpentine channel turn comprising a 180-degree bend connecting the second serpentine channel section and the third serpentine channel section,
wherein the serpentine channel terminus defines a through hole of the third serpentine channel section disposed in the radially outermost surface of the airfoil and in fluidic communication with the third serpentine channel section.

5. The airfoil according to claim 4, wherein the body further defines a longitudinal serpentine outflow orifice in the serpentine channel, the longitudinal serpentine outflow orifice defining a second through hole in the aft most portion of the third serpentine channel section and in fluidic communication with the third serpentine channel section.

6. The airfoil according to claim 1, wherein the trailing edge channel comprises a first trailing edge channel section disposed radially along the airfoil and immediately axially forward of the trailing edge of the airfoil.

7. The airfoil according to claim 6, wherein the body further defines a trailing edge channel outflow orifice in the trailing edge channel, the trailing edge channel outflow orifice defining a through hole in the trailing edge of the airfoil proximate to the trailing edge channel and in fluidic communication with the trailing edge channel.

8. The airfoil according to claim 6, the body further defining a trailing edge terminus core tie defining a through hole in a radially outermost surface of the airfoil and in fluidic communication with the trailing edge channel.

9. A turbine engine assembly comprising:
a high-speed spool comprising a row of circumferentially rotating rotors;
each rotor comprising a plurality of rotor blades; and
each of the plurality of rotor blades comprising:
a body defining a tip flag comprising a tip flag channel parallel to a leading edge of the rotor blade, a longitudinal tip channel extending axially aftward along a radially outermost surface of the rotor blade and terminating at the tip flag terminus, and a first tip flag channel turn comprising a 90-degree bend connecting the tip flag channel to the longitudinal tip channel, the tip flag configured to conduct cooling air through the body, wherein the tip flag terminus is axially forward of a trailing edge of the rotor blade;
a serpentine channel and a trailing edge channel, each configured to conduct cooling air through the rotor blade with the serpentine channel terminating at a serpentine channel terminus and the trailing edge channel terminating at a trailing edge channel terminus;
a tip channel core tie disposed in the longitudinal tip channel at the tip flag terminus and defining a through hole in the radially outermost surface of the rotor blade; and
a core tie disposed in the first tip flag channel turn and defining a through hole in the radially outermost surface of the rotor blade;
wherein the tip flag terminus is axially forward of the serpentine channel terminus and the serpentine channel terminus is axially forward of the trailing edge channel terminus.

10. The turbine engine assembly according to claim 9, wherein the tip flag channel comprises an outflow orifice defining a through hole in a surface of the rotor blade proximate to the tip flag channel and in fluidic communication with the tip flag channel.

11. The turbine engine assembly according to claim 9, wherein each serpentine channel comprises:
a first serpentine channel section disposed radially along the rotor blade and immediately axially aftward of the tip flag channel;
a second serpentine channel section disposed radially along the rotor blade and immediately axially aftward of the first serpentine channel section;
a third serpentine channel section disposed radially along the rotor blade and immediately axially aftward of the second serpentine channel section;
a first serpentine channel turn comprising a 180-degree bend connecting the first serpentine channel section and the second serpentine channel section; and
a second serpentine channel turn comprising a 180-degree bend connecting the second serpentine channel section and the third serpentine channel section,
wherein the serpentine channel terminus defines a through hole of the third serpentine channel section disposed in a radially outermost surface of the rotor blade and in fluidic communication with the third serpentine channel section.

12. The turbine engine assembly according to claim 9, wherein the trailing edge channel comprises a first trailing edge channel section disposed radially along the rotor blade and immediately axially forward of the trailing edge of the rotor blade.

13. A method of manufacturing an airfoil comprising:
forming the airfoil having a body defining a tip flag comprising a tip flag channel parallel to a leading edge of the airfoil, a longitudinal tip channel extending axially aftward along a radially outermost surface of the airfoil and terminating at a tip flag terminus axially forward of a trailing edge of the airfoil, and a first tip flag channel turn comprising a 90-degree bend connecting the tip flag channel to the longitudinal tip channel, the tip flag configured to conduct cooling air through the body, wherein the tip flag terminates at the tip flag terminus axially forward of the trailing edge of the airfoil;

forming a serpentine channel terminating at a serpentine channel terminus;

forming a trailing edge channel terminating at a trailing edge channel terminus, the serpentine channel and the trailing edge channel configured to conduct cooling air through the airfoil;

forming a tip channel core tie disposed in the longitudinal tip channel at the tip flag terminus and defining a through hole in the radially outermost surface of the airfoil; and forming a core tie disposed in the first tip flag channel turn and defining a through hole in the radially outermost surface of the airfoil, the tip flag terminus is axially forward of the serpentine channel terminus and the serpentine channel terminus is axially forward of the trailing edge channel terminus.

14. The airfoil of claim 1, wherein the tip flag channel is disposed along the leading edge of the airfoil.

* * * * *